(12) United States Patent
Møller et al.

(10) Patent No.: US 10,429,860 B2
(45) Date of Patent: Oct. 1, 2019

(54) ADJUSTABLE VALVE

(71) Applicant: FlowCon International ApS, Slagelse (DK)

(72) Inventors: Carsten Enøe Møller, Slagelse (DK); Bjarne Wittendorff Ibsen, Dubai (AE)

(73) Assignee: FlowCon International ApS, Slagelse (DK)

( * ) Notice: Subject to any disclaimer, the term of this patent is extended or adjusted under 35 U.S.C. 154(b) by 8 days.

(21) Appl. No.: 15/886,374

(22) Filed: Feb. 1, 2018

(65) Prior Publication Data

US 2019/0235536 A1  Aug. 1, 2019

(51) Int. Cl.
*F16K 31/38* (2006.01)
*G05D 16/16* (2006.01)

(52) U.S. Cl.
CPC ........... *G05D 16/163* (2013.01); *F16K 31/38* (2013.01); *Y10T 137/5283* (2015.04); *Y10T 137/7791* (2015.04)

(58) Field of Classification Search
CPC ......... Y10T 137/5109; Y10T 137/5283; Y10T 137/7668; Y10T 137/7787; Y10T 137/7791; Y10T 137/7869; Y10T 137/7878
USPC ...................................................... 251/205
See application file for complete search history.

(56) References Cited

U.S. PATENT DOCUMENTS

| 2,853,098 | A | * | 9/1958 | Fritzsche | ............. | G05D 7/0133 |
| | | | | | | 137/517 |
| 3,747,629 | A | * | 7/1973 | Bauman | ............. | G05D 16/0661 |
| | | | | | | 137/270 |
| 3,825,029 | A | * | 7/1974 | Genbauffe | ............ | F16K 31/365 |
| | | | | | | 137/271 |
| 3,938,542 | A | * | 2/1976 | Bolha | ................... | F16K 31/365 |
| | | | | | | 137/271 |

(Continued)

FOREIGN PATENT DOCUMENTS

| DK | 117527 | 5/1970 |
| EP | 2894535 | 7/2015 |
| EP | 2894536 | 7/2015 |

OTHER PUBLICATIONS

Search Report dated Feb. 28, 2017 from Danish Patent Application No. PA201670569.

*Primary Examiner* — Robert K Arundale
(74) *Attorney, Agent, or Firm* — K. David Crockett, Esq.; Paul J. Backofen, Esq.; Crockett & Crockett, PC

(57) ABSTRACT

An adjustable differential pressure control valve has a first housing part with one or more fluid entry openings and one or more fluid exit openings. The valve is provided with a movable throttle member configured for regulating the through flow area of the exit openings in response to a difference in pressure across the throttle member, and a spring arrangement configured for providing a spring force acting on the throttle member in a direction that increases the through flow area of the exit openings. The spring arrangement comprises at least a first and a second spring, and the spring arrangement is adjustable to operate in a low pressure (Continued)

mode with the spring force acting on the throttle member being provided by the first spring only, and to operate in a high pressure mode with the spring force acting on the throttle member being provided by at least both the first and second springs.

18 Claims, 7 Drawing Sheets

(56) References Cited

U.S. PATENT DOCUMENTS

| | | | | |
|---|---|---|---|---|
| 4,304,546 | A * | 12/1981 | Demi | F23N 1/007 |
| | | | | 137/503 |
| 6,725,880 | B1 * | 4/2004 | Liu | G05D 7/0126 |
| | | | | 137/501 |
| 6,827,100 | B1 * | 12/2004 | Carlson | G05D 7/0106 |
| | | | | 137/454.6 |
| 9,285,059 | B2 * | 3/2016 | Ibsen | F16K 39/026 |
| 2005/0039797 | A1 * | 2/2005 | Carlson | G05D 7/0106 |
| | | | | 137/494 |
| 2011/0240148 | A1 | 10/2011 | Norlander | |
| 2012/0037830 | A1 | 2/2012 | Bill et al. | |
| 2013/0261813 | A1 * | 10/2013 | Ibsen | F16K 3/246 |
| | | | | 700/282 |
| 2014/0191148 | A1 * | 7/2014 | Pedersen | F16K 5/0407 |
| | | | | 251/309 |
| 2015/0198258 | A1 * | 7/2015 | Ibsen | F16K 3/24 |
| | | | | 137/556.6 |

* cited by examiner

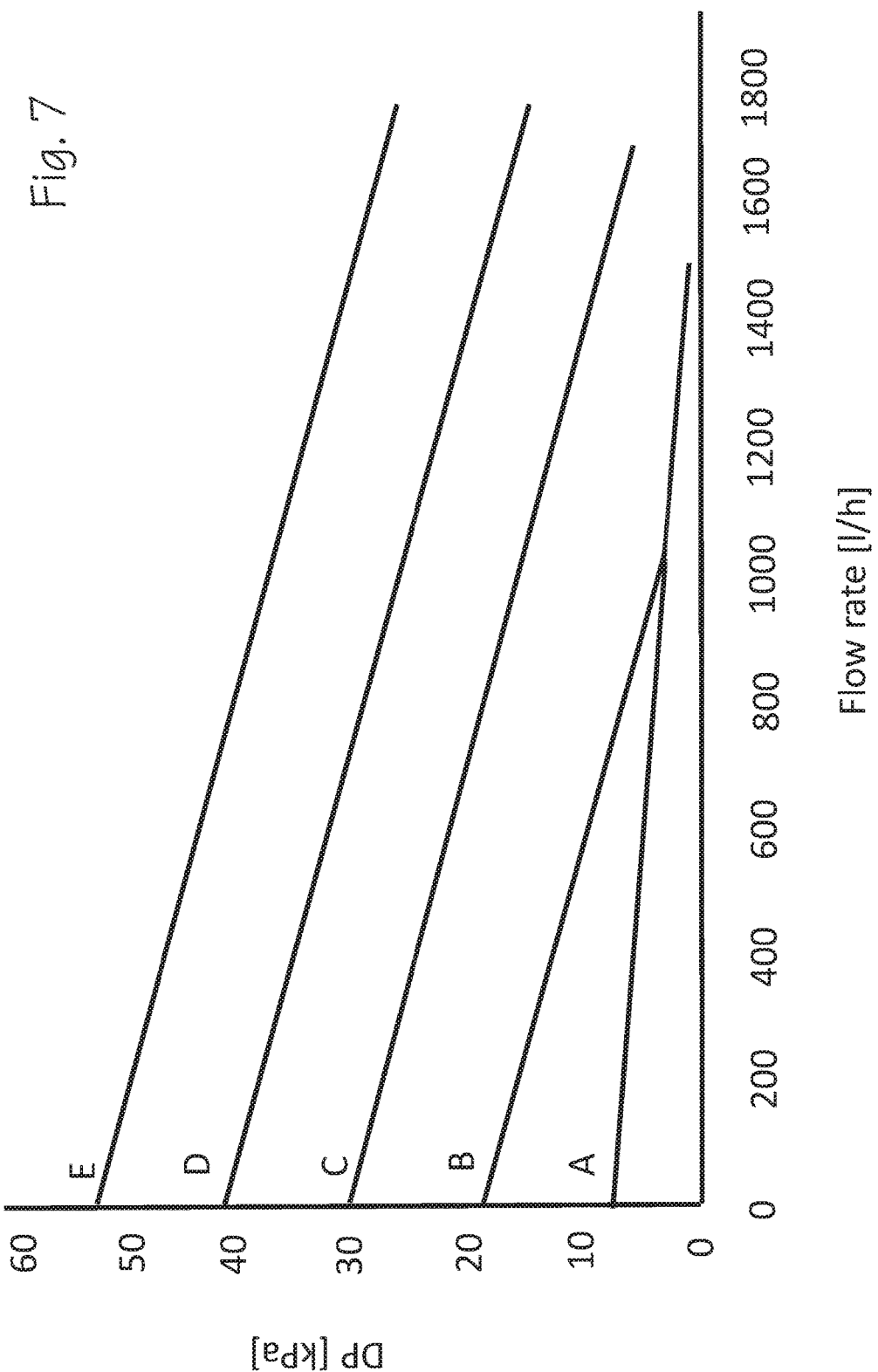

ADJUSTABLE VALVE

FIELD OF THE INVENTIONS

The disclosure relates to a valve, which can be used as a control valve in liquid-carrying systems, which control valve is of the type adapted to serve as a differential pressure control valve.

BACKGROUND OF THE INVENTIONS

Differential pressure control valves, DPC valves, are used particularly in connection with systems for heating or cooling, but in general everywhere where there is a need for maintaining a constant differential pressure over an inlet side with a supply pipe and an outlet side with a return pipe, irrespective of the amount flowing therethrough.

With differential pressure control valves it is possible to maintain a substantially constant differential pressure, DP, between the supply pipe and the return pipe. This constant differential pressure, which is regulated by the differential pressure control valve, is also called the set-point of the differential pressure control valve.

The differential pressure, DP, which ideally is to be held constant, is determined by the system, which thereby also determines the pre-setting value or set-point of the differential pressure control valve.

The differential pressure to be held constant, will vary within a wide pressure range for different systems, and may vary within a range of 5 to 75 kPa. In order to cover such a wide differential pressure range, several differential pressure control valves are needed, where the valves have different springs providing different spring forces.

It would be advantageous to have a single differential pressure control valve covering a wide range of differential pressure, whereby the number of different valves for covering different DP ranges can be reduced.

SUMMARY

It is an object of the invention to provide an adjustable valve, which can be used as a differential pressure control valve covering a large range of DP pre-setting values.

This object is achieved in accordance with a first aspect by providing an adjustable valve or valve insert, the valve or valve insert comprising:
 a first housing part with one or more fluid entry openings and one or more fluid exit openings,
 a movable throttle member configured for regulating the through flow area of the exit openings in response to a difference in pressure across the throttle member,
 a spring arrangement configured for providing a spring force acting on the throttle member in a direction that increases the through flow area of the exit openings,
 wherein the spring arrangement comprises at least a first and a second spring, and
 wherein the spring arrangement is adjustable to operate in a low pressure mode with the spring force acting on the throttle member being provided by the first spring only, and to operate in a high pressure mode with the spring force acting on the throttle member being provided by at least both the first and second springs.

In an embodiment the first and second springs are compression coil springs placed along the same axis of compression, and the first spring is positioned for providing a spring force to the throttle member, while the position of the second spring is adjustable between a low pressure setting, in which the second spring is not providing a spring force to the throttle member, and a high pressure setting, in which the second spring is positioned for providing a spring force to the throttle member.

Thus, when the second spring is in the low pressure setting, only the first spring is positioned for providing a spring force to the throttle member, and the spring arrangement is operating in the low pressure mode. When the second spring is in the high pressure setting, both the first and second springs may be positioned for providing a spring force to the throttle member, and the spring arrangement is operating in the high pressure mode.

In an embodiment the bottom part of the first spring is arranged at a fixed position along the axis of compression, while the position of the bottom part of the second spring is adjustable along the axis of compression.

In an embodiment the first and second springs have different diameters, and the second spring may encompass the first spring when the spring arrangement is adjusted to operate in the high pressure mode. It is also within an embodiment that the first spring encompasses the second spring when in the high pressure mode.

In an embodiment the valve or valve insert further comprises a spindle holding first and second springs supports, where the spindle is arranged along the compression axis of the springs with the springs encompassing at least part of the spindle. Here, the bottom part of the first spring may be supported by the first spring support and the bottom part of the second spring may be supported by the second spring support, and the second spring support may be moved in the axial direction of the spindle for adjusting the position of the second spring.

In an embodiment the spindle and the second spring support are configured for moving the second spring support by rotating the spindle.

In an embodiment the throttle member comprises a piston. The piston may have an inner part receiving the spring force provided by the spring arrangement and an outer part cooperating with the one or more exit openings to thereby regulate the through flow area.

In an embodiment the throttle member comprises a diaphragm or rolling diaphragm having an inner part receiving the spring force provided by the spring arrangement and an outer part cooperating with the one or more exit openings to thereby regulate the through flow area.

In an embodiment the inner peripheral edge of the diaphragm is secured to the upper part of a cap being axially displaceable along the compression axis of the springs, and the lower part of the cap is configured for receiving the upper ends of the first and second springs.

In an embodiment the cap is axially displaceable arranged on the spindle, with the springs arranged between the cap and the spring supports.

In an embodiment the first housing part defines a first chamber with the entry openings being configured at a lower part and the exit openings being configured at an upper part of the first chamber. Here, the throttle member may be arranged in the upper part of the first chamber for regulating the through flow area of the exit openings.

In an embodiment the outer peripheral edge of the rolling diaphragm is secured to the walls of the first chamber above the exit openings.

In an embodiment the valve or valve insert further comprises a second housing part defining a second chamber above the diaphragm and the first chamber, with the pressure in the first chamber acting on the diaphragm for increasing the through flow area of the exit openings and the pressure in the second chamber acting on the diaphragm for decreasing the through flow area of the exit openings.

In an embodiment the second housing part holds a control port in fluid connection with the second chamber.

In an embodiment the spring arrangement further comprises a third spring. When provided with a third spring, the spring arrangement may be adjustable to operate in the high pressure mode with the spring force acting on the throttle member being provided by the first, second and third springs. The spring arrangement may further be adjustable to operate in an intermediate pressure mode with the spring force acting on the throttle member being provided by the first and second springs, and not by the third spring. The first, second and third springs may be placed along the same axis of compression.

In an embodiment the spring arrangement further comprises a fourth spring. When further provided with third and fourth springs, the spring arrangement may be adjustable to operate in the high pressure mode with the spring force acting on the throttle member being provided by the first, second, third and fourth springs. The spring arrangement may further be adjustable to operate in several intermediate pressures mode, wherein for a first intermediate pressure mode the spring force acting on the throttle member is provided by the first and second springs, and not by the third and fourth springs, and wherein for a second intermediate pressure mode the spring force acting on the throttle member is provided by the first, second and third springs, and not by the fourth spring. The first, second, third and fourth springs may be placed along the same axis of compression.

The foregoing and other objects are achieved by the features of the independent claims. Further implementation forms are apparent from the dependent claims, the description and the figures. These and other aspects of the invention will be apparent from the embodiments described below.

BRIEF DESCRIPTION OF THE DRAWINGS

In the following detailed portion of the present disclosure, the invention will be explained in more detail with reference to the example embodiments shown in the drawings, in which:

FIG. 7 is a diagram with curves showing changes in differential pressure as a function of increased fluid flow for systems including a differential pressure control valve, each system requiring a different pre-setting for the differential pressure according to an example embodiment of the present disclosure.

DETAILED DESCRIPTION OF THE INVENTIONS

Figure 1:
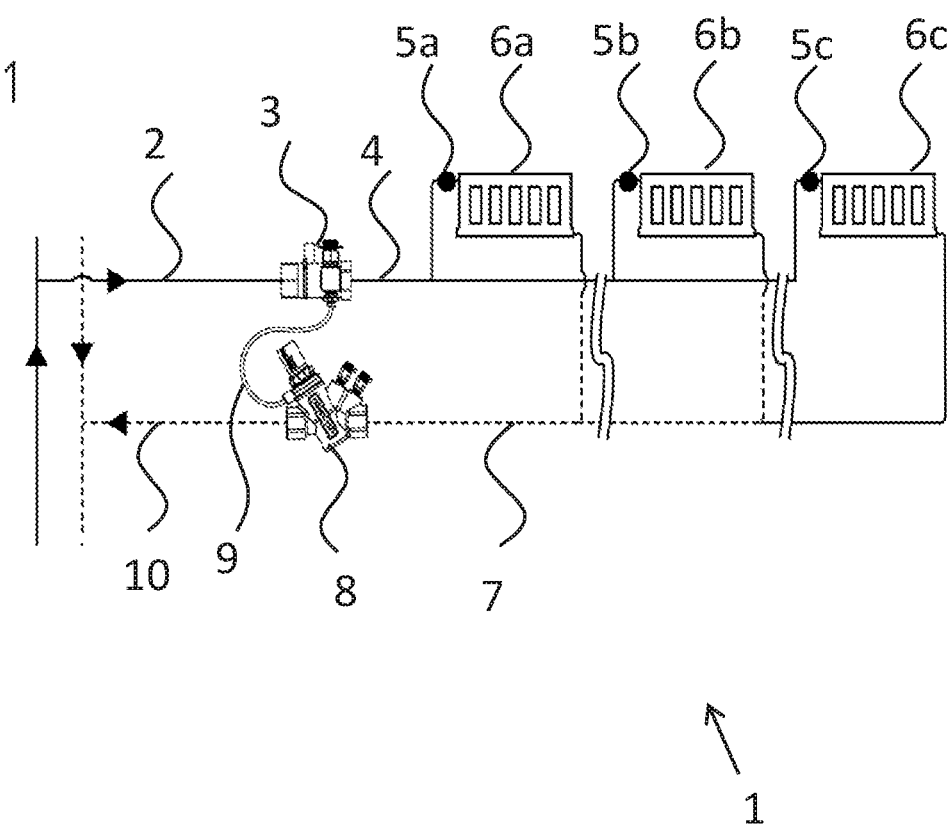
FIG. 1 is a block diagram illustrating the arrangement of a differential pressure control valve within a heating system.

FIG. 1 is a block diagram illustrating a heating system 1 configured for maintaining a constant differential pressure over an inlet side and an outlet side. The system 1 has a inlet 2 supplied by heated liquid from a pump (not shown in FIG. 1). A partner valve 3 is arranged at the inlet side 2, with the outlet of the partner valve 3 connected to a supply pipe 4 for supplying a number of heat dissipating elements or radiators 6a, 6b, 6c, each having a corresponding thermostat valve 5a, 5b, 5c, at the supply side 4. The outlets of the radiators 6a, 6b, 6c, are connected to a return pipe 7, which is fed to an inlet of a differential pressure control vale, DPC valve, 8, with the outlet of the DPC valve 8 connected to an outlet 10. The DPC valve 8 has a control port connected to an end of capillary tube 9, which at the other end is connected to the partner valve 3.

The pump supplies the liquid at a pressure resulting in a pressure difference DPin between the pressure Pin at the inlet side 2 and the pressure Pout at the outlet side 10. The pressure P1 at the output side of the partner valve 3, which pressure is substantial equal to the pressure at the supply pipe 4, is supplied via the capillary tube 9 to the DPC valve 8. The pressure P2 at the inlet side of the DPC valve 8 is substantial equal to the pressure at the return pipe 7, with a differential pressure DP equal to (P1−P2) being defined from the supply pipe 4 to the return pipe 7.

When liquid is flowing in the system 1, there is a pressure drop (Pin−P1) across the partner valve 3, a differential pressure drop DP=(P1−P2) across the radiators 6a, 6b, 6c, and a pressure drop (P2−Pout) from the inlet side to the outlet side of the DPC valve 8. The DPC valve 8 senses changes in DP by sensing changes between the pressure at the control port and the pressure at the inlet side of the valve 8. The DPC valve 8 is configured to maintain the differential pressure drop DP across the radiators 6a, 6b, 6c as constant as possible, which is done by changing to output flow area in response to changes in DP, thereby counter balancing any changes in DP.

The sizing of the pump supplying the liquid and thereby the pressure Pin at the inlet side 2 increases with the number of heat dissipating elements or radiators 6. The increase in inlet pressure Pin is followed by an increase in the maximum differential pressure DP across the radiators 6. Thus, a larger system requires a higher maximum DP being maintained by the DPC valve 8, which requires a higher DP pre-setting for the DPC valve 8.

When using a known DPC valve, such as the FlowCon® DPCV valve, in the system 1, the DPC valve 8 comprises a diaphragm positioned inside a diaphragm housing, the diaphragm is arranged between a low pressure chamber connected through the valve inlet with the return pipe 7 and a high pressure chamber connected to the supply pipe 4 via the capillary tube 9. A spring is arranged in the low pressure chamber for providing a spring force acting on the diaphragm to counter balance the pressure from the high pressure chamber. The diaphragm is further arranged for increasing the output flow area of the DPC valve 8 in response to a decrease in the differential pressure, DP, across the diaphragm and to increase the output flow area of the DPC valve 8 in response to an increase in the differential pressure, DP, across the diaphragm. Thus, the diaphragm is arranged for regulating the output flow area of the DPC valve 8 in response to a change in the pressure difference across the diaphragm, and thereby to counter balance a change in DP. By setting the spring in a more or less compressed position, the spring force acting on the membrane can be adjusted, whereby the differential pressure across the membrane, and thereby the system DP, can be set to the DP required by the system. However, the DP range of this known DPC valve is limited by the possible adjustment of the spring force being delivered by the spring.

It is noted that the known DPC valve having a diaphragm for regulating the valve output flow area is not fully capable of maintaining a constant DP as a function of fluid flow through the system 1. The highest DP value is obtained at low flow rate values, and as the flow through the pipes 4 and 7 increases, which happens when the thermostat valves 5 open up for more liquid, the pressure P1 at the supply pipe 4 initially decreases, while the pressure P2 at the return pipe 7 initially increases, with the result that the differential pressure DP=(P1−P2) decreases. This initial drop in DP causes the diaphragm to increase the output flow area of the DPC valve 8, which causes a drop in the return pipe pressure P2, giving a rise in DP to at least partly counter balance the initial change in DP and stabilize the differential pressure DP at a value a bit below the start value of DP.

FIGS. 2 to 5 are cross-sectional views of a valve insert 100 for a DPC valve operating in different pressure modes according to an example embodiment. When in use, the valve insert 100 forms part of a DPC valve as illustrated in FIG. 6. By using the valve insert 100, a DPC valve can operate within a DP range, which is larger than the DP range of known DPC valves.

The insert of FIGS. 2 to 5 has a first housing part 101 with fluid entry openings 102 and fluid exit openings 103. A throttle member in form of a diaphragm 104 is provided for regulating the through flow area of the exit openings 103 in response to a difference in pressure across the diaphragm 104, with a spring arrangement 105 being placed below the diaphragm 104 and configured for providing a spring force acting on the diaphragm 104 in a direction for increasing the through flow area of the exit openings 103. The spring arrangement 105 comprises a first spring 106 and a second spring 107. The first and second springs 106, 107 are compression coil springs placed along the same axis of compression. The insert is also provided with a spindle 108 holding a first spring support 109 and a second spring support 110, where the spindle 108 has a threaded lower part 111, which threadedly connects to the second spring support 110, whereby the second spring support 110 can be moved in the axial direction of the spindle 108 by rotating the spindle 108. The first spring support 109 is a fixed part of the spindle 108 and placed above the threaded part 111 of the spindle 108. The first and second springs 106, 107 are arranged to encompass a part of the spindle 108 with the spindle 108 extending along the compression axis of the springs 106, 107. The bottom part of the first spring 106 is supported by the first spring support 109, and the bottom part of the second spring 107 is supported by the second spring support 110. Thus, the position of the second spring 107 can be adjusted in the axial direction of the spindle 108 by movement of the second spring support 110 relative to the spindle 108. The first and second springs 106, 107 have different diameters, and for the insert 100, the diameter of the second spring 107 is larger than the diameter of the first spring 106. Thus, the second spring 107 may encompass at least a part of the first spring 106, depending on the position of the second spring support 110. It is also within embodiments of the disclosure that the diameter of the second spring 107 is smaller than the diameter of the first spring 106.

The diaphragm 104 may be a rolling diaphragm having an inner peripheral edge secured to the upper part of a cap 112, which is arranged axially displaceable along the spindle 108. The outer peripheral edge of the rolling diaphragm 104 is secured to the walls of the first housing part 101 above the exit openings. The lower part of the cap 112 is configured for receiving the upper ends of first and second springs 106, 107, with the springs 106, 107 arranged between the cap 112 and the spring supports 109, 110. This arrangement allows the inner part of the diaphragm 104 to receive a spring force supplied by one or both of the springs 106, 107 to the cap 112, while the outer part of the diaphragm 104 can cooperate with the exit openings 103 in response to a pressure difference across the diaphragm 104 and the spring force provided by the spring arrangement 105.

Figure 2:
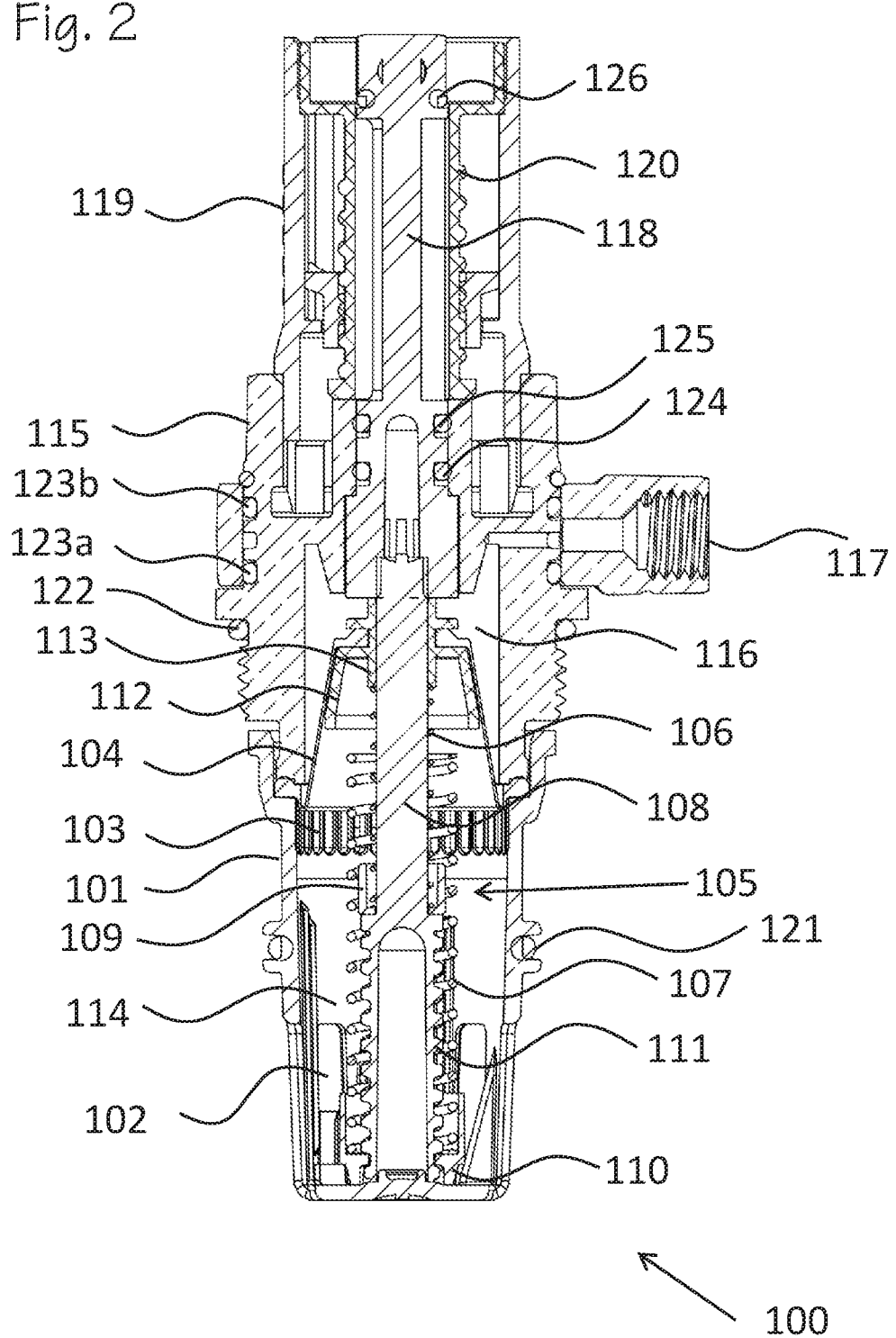
FIG. 2 is a cross-sectional view of a valve insert for a differential pressure control valve operating in a low pressure mode with a low control pressure according to an example embodiment.

For the embodiment of an insert 100 shown in FIG. 2, the cap 112 has an inner sliding part 113, which slidingly connects the cap 112 to the spindle 108. The lower end of the sliding part 113 is configured to receive or abut with the upper end of the first spring 106, while the outer diameter of the lower end of the sliding part 113 is smaller than the inner diameter of the second spring 107, whereby the upper end of the second spring is allowed to be received in the cap 112 while encompassing the first spring 106 and the lower end of the sliding part 113.

The first housing part 101 defines a first chamber 114, with the entry openings 102 provided at the lower part and the exit openings 103 provided at the upper part of the first chamber 114. The diaphragm 104 is arranged for regulating the through flow area of the exit openings 103 at the upper part of the first chamber 114. The outer peripheral edge of the rolling diaphragm 104, which is secured to the walls of the first housing part 101, is thereby also secured to the walls of the first chamber 114 above the exit openings 103.

The insert 100 also has a second housing part 115, which defines a second chamber 116 above the first chamber 114, with the diaphragm 104 providing an interface between the first and second chambers 114, 116. The pressure in the first chamber 114 acts on the diaphragm for 104 in a direction that increases the through flow area of the exit opening and the pressure in the second chamber 116 acts on the diaphragm 104 in a direction for decreasing the through flow area of the exit openings.

The pressure in the first chamber 114 is provided by fluid received at the entry openings 102, while the pressure in the second chamber is provided by fluid received through a control port 117, which is in fluid connection the second chamber 116.

In order to rotate the spindle 108 and thereby adjust the position of the bottom part of the second spring 107, a shaft 118 is provided at the upper part of the insert 100. The upper part of the insert 100 also holds an outer jacket 119. A sleeve 120 having an external thread is arranged to encompass part of the shaft, and further arranged to rotate together with the shaft 118. An indicator, not shown in FIG. 2, may be threadedly connected to the sleeve 120, whereby the indicator is moved between different indicator positions when the shaft 118 is rotated to adjust the position of the second spring 107.

The exit openings 103 are formed as longitudinal slits extending in the direction of the spindle 108 and the spring compression axis. Thus, in order to move the rolling diaphragm 104 from a position in which the openings 103 are fully closed and to a position in which the openings 103 are fully open, the diaphragm 104 needs to be moved along the spindle 108 at a distance equal to or larger than the longitudinal extension of the opening slits 103.

The insert 100 holds a number of sealing rings (O-rings) 121, 122, 123a, 123b, 124, 125 and 126, with sealing rings 121 and 122 being outer sealing rings for sealing the insert 100 to a valve housing as described in connection with FIG. 6.

The first and second housing parts 101, 115 and the control port 117 of the insert 100 is in an embodiment made from a suitable metal alloy, such as e.g. bronze (including gunmetal), brass (including corrosion-resistant and dezincification resistant brass, DZR or DR), ductile iron or steel (including stainless steel) and can be manufactured by a suitable molding technique such as hot pressing, die casting or forging.

For the embodiment of a valve insert 100 illustrated in FIGS. 2 to 5, the moveable throttle member is formed by a diaphragm 104. However, it is also within one or more embodiments of the present disclosure that the movable throttle member comprises or is formed by a piston. The piston may be moved in the direction of the spring compression axis to regulate the through flow area of the exit openings. The piston may have an inner part receiving the spring force provided by the spring arrangement and an outer part cooperating with the one or more exit openings to thereby regulate the through flow area.

As mentioned above, the insert 100 can be used as part of DPC valve. This is illustrated in FIG. 6, which is a cross-sectional view of a DPC control valve 200 according to an example embodiment. The DPC valve 200 has a valve housing 201 with an inlet part 202 and an outlet part 203, and holds the insert 100 arranged in between the inlet part 201 and the outlet part 203, whereby the DP setting of the valve 200 is determined by the DP setting of the insert 100, and the through flow area of the valve 200 is determined by the through flow area of the insert 100. The insert 100 is mounted and sealed to the valve housing 201 via cooperating threads 204 and the O-rings 121 and 122. The O-ring 121 seals the insert 100 to the inner wall of the valve housing 201 for dividing the valve housing 201 in the inlet part 202 and the outlet part 203. For the embodiment of a control valve 200 shown in FIG. 6 the insert 100 is arranged in a slanting seat within the housing 201. However, the insert 100 may also be arranged in other positions relative to the housing 201.

The valve housing 201 can be provided with two pressure/temperature test plugs 205 and 206. The first test plug 205 may be configured to measure the pressure at the inlet part 202 of the valve 200 and thereby at the entry openings 102 of the insert 100, while the second test plug 206 may be configured to measure the pressure at the outlet side of the exit openings 103 of the insert 100 and thereby the outlet part 203 of the valve 200. From the test plugs 205 and 206, a pressure differential reading can be taken from the inlet 203 to the outlet 203 across the valve 200.

The valve housing 201 is in an embodiment made from a suitable metal alloy, such as brass, and may be manufactured by die casting. The second housing part 115 of the insert 100 may also be made from a suitable metal alloy, such as brass. The first housing part 101 of the insert 100 is in an embodiment made from a plastic material, which is also in an embodiment the material used for the spindle 108 and the cap 112. Both the inlet part 202 and the outlet part may be provided with internal or external threads (not shown) or other connection facilities, such as press end connections, for connection to pipes of a heating or cooling plant.

When a DPC valve 200 provided with the insert 100 is used in the system 1 of FIG. 1, the control port 117 will be in fluid connection with the output of the partner valve 3 via the capillary tube 9, and the entry openings 102 will be in fluid connection with the return pipe 7. Thus, the difference in fluid pressure across the membrane 104 is equal to the differential pressure DP of the system, which is ideally to be held constant.

For systems requiring a high value of the maximum differential pressure DP, there will be a high pressure difference across the diaphragm 104, urging the diaphragm 104 to close off the through flow area of the exit openings 103. In order to maintain a flow through the valve with the insert 100, the spring force acting on the diaphragm 104 needs to match the required DP, and to be increased with increased maximum DP.

The possible DP range, in which a DPC valve with the insert 100 can operate, is determined by the dimensions and spring forces of the first and second springs 106, 107 together with the arrangement of the springs 106, 107 relative to the diaphragm 104. In order to operate in systems requiring a high flow rate at a low value of DP, the first spring 106 is selected to have a very low spring constant, and the first spring 106 must have a length to reach from the first spring support 109 to the lower receiving end of the sliding part 113 of the cap 112, when the cap 112 and the diaphragm 104 are in an uppermost position along the spindle 108 providing a maximum through flow area for the exit openings 103. When having a low spring force for the first spring 106, the movement of the cap 112 and the diaphragm 104 downwards along the spindle 108, which is caused by an increase in the value of DP when the flow rate decreases, will be quite large in order to obtain a compression of the first spring 106 to counter balance the increase in the value of DP.

Figure 3:
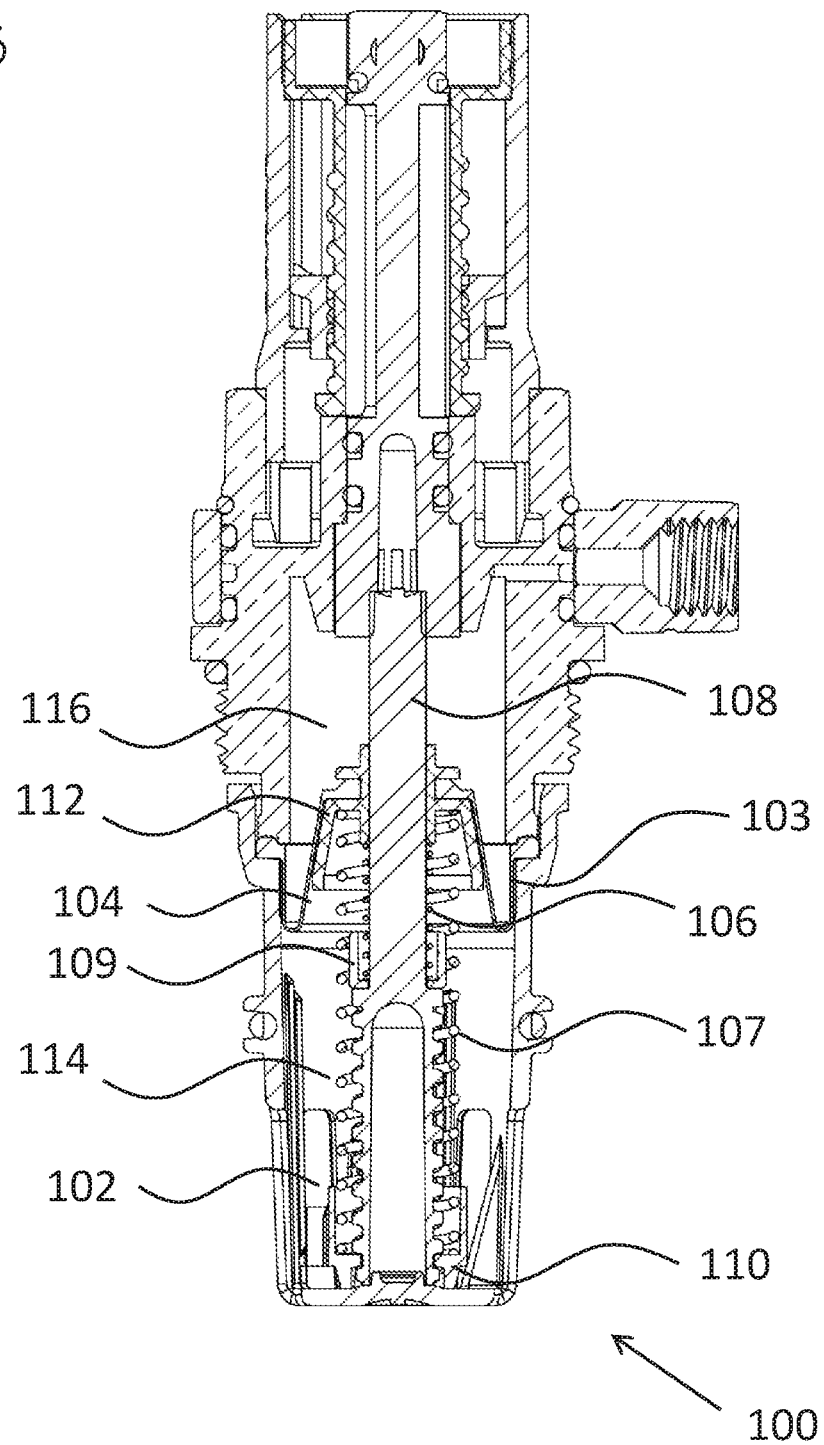
FIG. 3 is a cross-sectional view of the valve insert of FIG. 2 operating in a low pressure mode with a relatively high control pressure according to an example embodiment.

When operating in systems requiring a very low value DP range, it is preferred that the spring force acting on the diaphragm 104 is provided by the first spring 106 only. Here, the length and arrangement of the second spring 107 may be determined so that there is substantially no compression of the second spring 107 and thereby substantially no spring force delivered by the second spring 107 to the diaphragm 104, when the cap 112 and the diaphragm 104 is moved from the uppermost to the lowermost position along the spindle 108, where in the lowermost position the diaphragm 104 is arranged to provide a minimum flow area for the exit openings 103. This situation is illustrated in FIGS. 2 and 3, where the insert 100 is set to operate in a first, low value DP range, with the second spring support 110 and the second spring 107 set to the lowest position along the spindle 108.

In FIG. 2 the insert 100 is operating with a high flow rate and a low control pressure in the second chamber 116, and the diaphragm 104 is in the uppermost position providing a maximum through flow area for the exit openings 103. The counter balancing to be supplied by the spring force of the first spring 106 is at a minimum, and the first spring 106 reaches from the first spring support 109 to the cap 112 with a minimum of compression, while the second spring 107 is fully relaxed without any contact to cap 112. In FIG. 3 the insert 100 is operating with a low flow rate and a higher control pressure in the second chamber 116, and the diaphragm 104 is in the lowermost position providing a minimum through flow area for the exit openings 103. The first spring 106 is compressed to provide its maximum counter balancing spring force to the diaphragm 104, while the second spring 107 reaches from the second spring support 110 to the cap 112 substantially without being compressed When operating in systems requiring a high DP value range, it is preferred that the spring force acting on the diaphragm 104 is provided by both the first spring 106 and the second spring 107. When operating with the highest setting of DP range, the second spring support 110 and the second spring 107 are set to a high position along the spindle 108. This situation is illustrated in FIGS. 4 and 5, where the insert 100 is set to operate in the highest DP value range.

Figure 4:
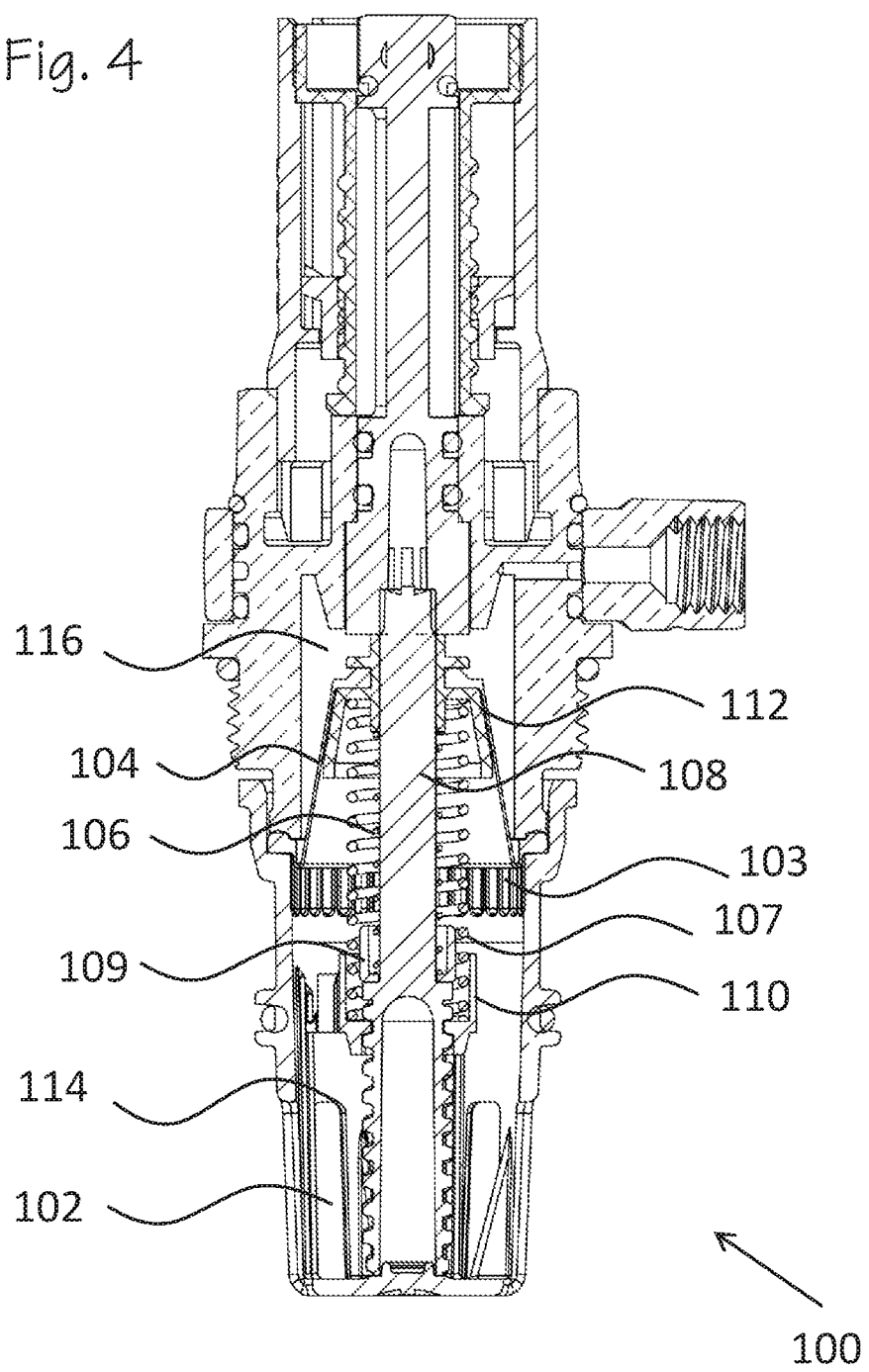
FIG. 4 is a cross-sectional view of the valve insert of FIG. 2 operating in a high pressure mode with a low control pressure according to an example embodiment.

In FIG. 4 the insert 100 is operating with a high flow rate and a relatively low control pressure in the second chamber 116, and the diaphragm 104 is in the uppermost position providing a maximum through flow area for the exit openings 103. The counter balancing to be supplied by the spring force of the first and second springs 106, 107 is at a minimum of the current DP setting, and the first spring 106 reaches from the first spring support 109 to the cap 112 with a minimum of compression, while the second spring 107 now reaches from the second spring support 110 to the cap 112, but being compressed to provide the required DP setting. In FIG. 5 the insert 100 is operating with a low flow rate and a higher control pressure in the second chamber 116, when compared to FIG. 4, and the diaphragm 104 is in the lowermost position providing a minimum through flow area for the exit openings 103. Both the first spring 106 and the second spring 107 are now compressed to provide the maximum counter balancing spring force to the diaphragm 104.

The maximum DP range, in which the insert 100 can be set to operate, is determined by the maximum spring force provided by the first and second springs 106, 107 in combination. The dimensions of the first spring 106 is determined by the lowest DP range, in which the insert 100 is operating. The spring force provided by the first spring 106 when operating in high DP range at a low flow rate is very low, and the length and spring constant of the second spring 107 are then determined in order to be able to deliver the highest required DP range. It is therefore within embodiments of the disclosure that the spring constant of the second spring 107 is selected to be higher than the spring constant of the first spring 106, such as for example 2, 3 or 4 times higher.

Figure 5:
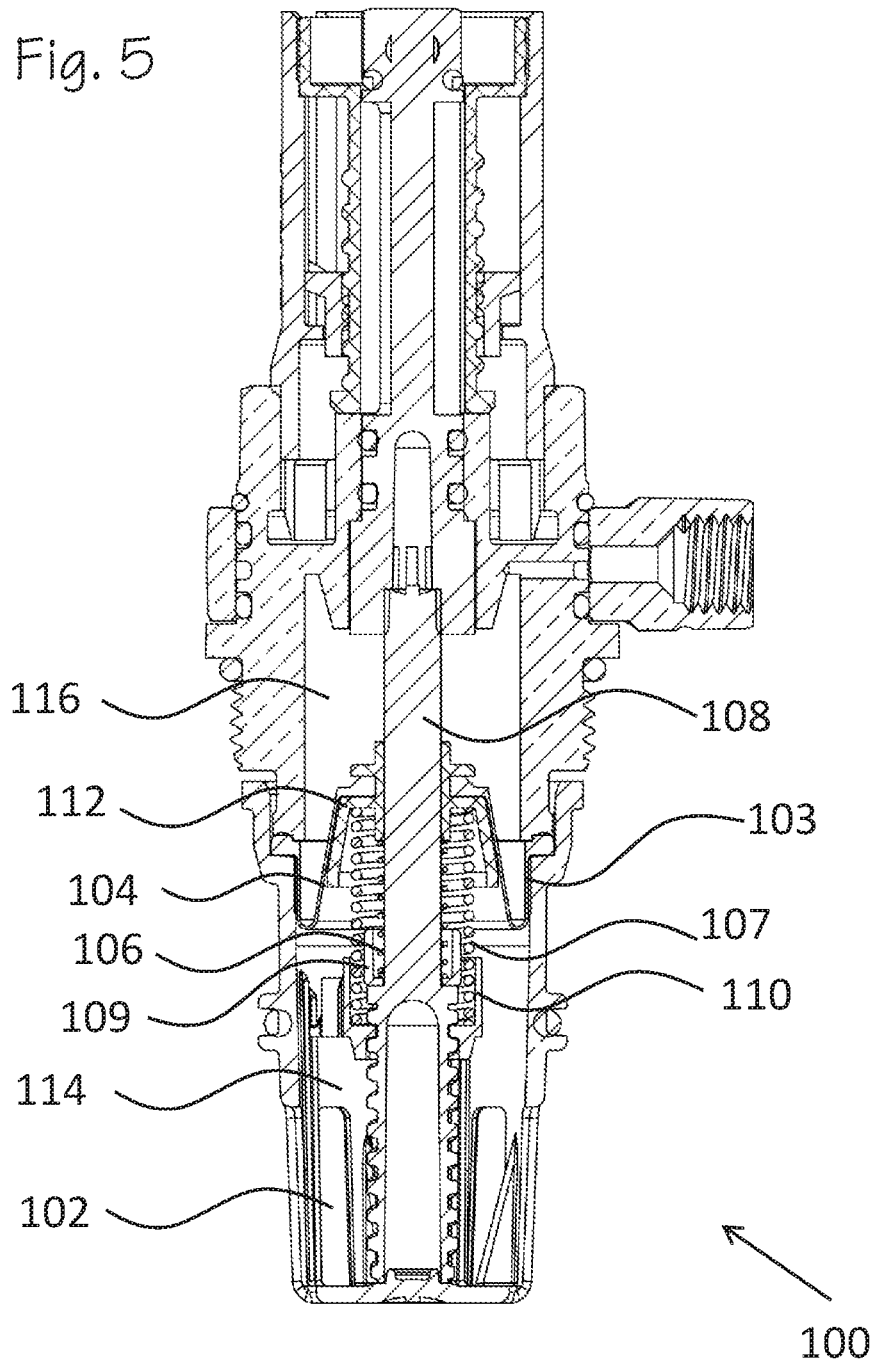
FIG. 5 is a cross-sectional view of the valve insert of FIG. 2 operating in a high pressure mode with a relatively high control pressure according to an example embodiment.
Figure 6:
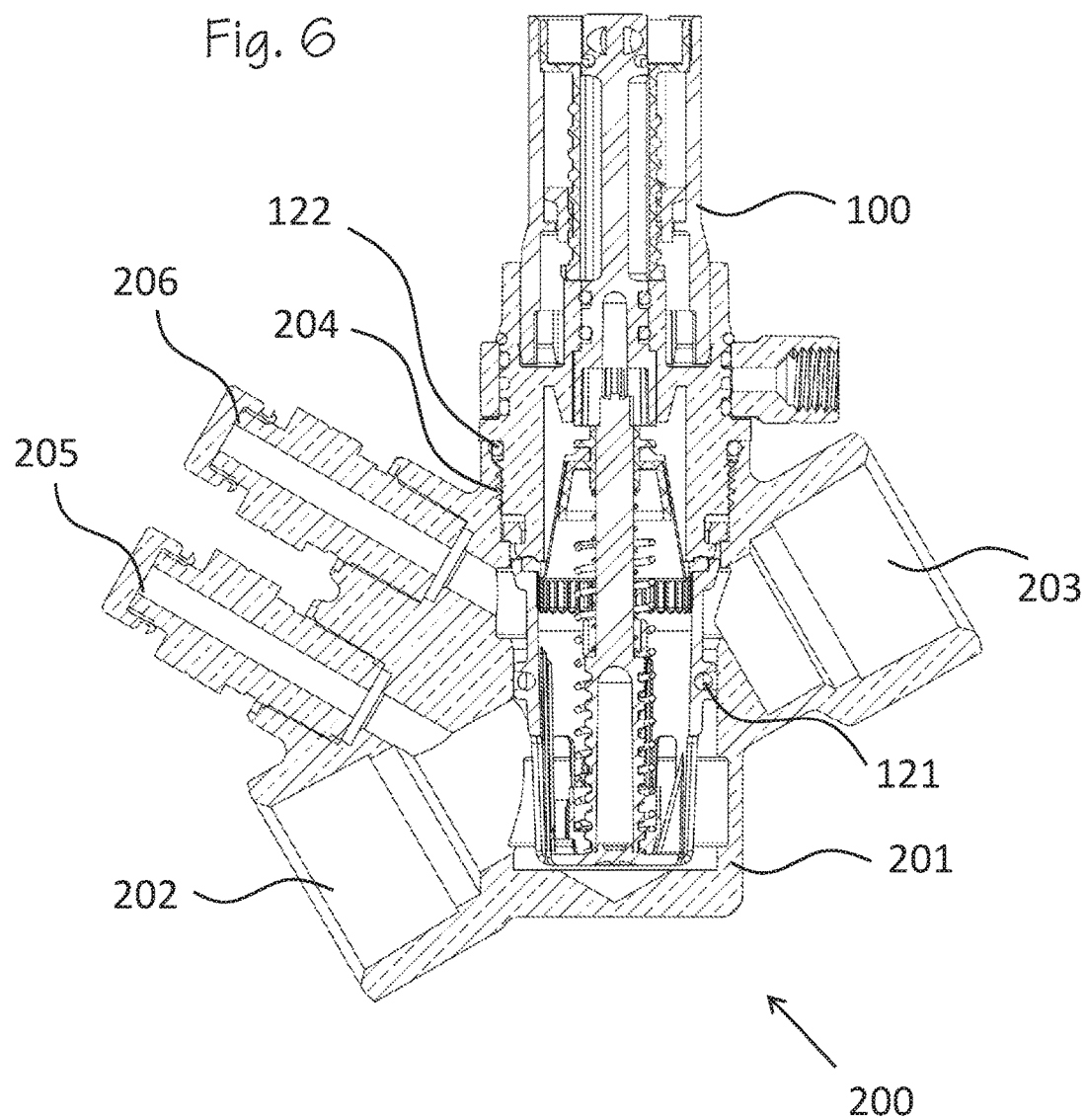
FIG. 6 is a cross-sectional view of a differential pressure control valve according to an example embodiment.

The insert 100 can be set to operate in systems requiring DP settings in between the minimum DP setting of FIGS. 2 and 3 and the maximum DP setting of FIGS. 4 and 5, by adjusting the position of the second spring support 110 and thereby the position of the second spring 107. By adjusting the position of the second spring 107, the compression and the spring force provided by the second spring 107 is adjusted accordingly.

This situation is illustrated in FIG. 7, which holds a number of curves, A, B, C, D, E showing changes in differential pressure, DP, as a function of increased flow rates for systems similar to the system of FIG. 1 including a differential pressure control valve, where each system requires a different DP pre-setting. The differential pressure control valve of the systems has a valve insert 100 according to an example embodiment of the present disclosure.

In FIG. 7, curve A corresponds to the minimum DP setting of FIGS. 2 and 3, in which the spring force acting on the diaphragm 104 is provided by the first spring 106 only. Curve E corresponds to the maximum DP setting of FIGS. 4 and 5, in which the compression of the second spring 107 is set to its maximum, with the spring force acting on the diaphragm 104 provided by both the first and second springs 106, 107. For curve D, the bottom of the second spring 107 is at a lower position than for curve E, and the compression of the second spring 107 is set to be lower than for curve E. For curve C, the bottom of the second spring 107 is at a lower position than for curve D, and the compression of the second spring 107 is set to be lower than for curve D. For both curves D and C, the spring force acting on the diaphragm 104 is provided by both the first and second springs 106, 107 when the flow rate decreases and the diaphragm 104 is moved downwards. Curve B shows a third mode of operation, in which the pre-setting of DP is set in-between the pre-settings of curves A and C, with the bottom of the second set between the lowest position and the position of curve C. In the third mode of operation, curve B, then for low flow rates where the diaphragm is urged downwards by the relatively high pressure in the second chamber 116, both the first and second springs 106, 107 are acting to provide the spring force to the diaphragm 104, while at higher flow rates, when the diaphragm 104 is moved upwards due to a decrease in the pressure in the second chamber 116, the second spring 107 no longer interacts with the diaphragm 104, and the spring force is provided by the first spring 106 only. Curve B illustrates the situation where the spring force is provided by both springs 106, 107 for flow rates below 1000 l/h, while the spring force is provided by the first spring only for flow rates above 1000 l/h.

According to an example embodiment of a DPC valve provided with an insert 100 having a first spring 106 and a second spring 107, a DP pre-setting range with DP values from 8 to 62 kPa has been obtained.

For the embodiment of a valve insert 100 illustrated in FIGS. 2 to 5, the spring arrangement 105 comprises two springs, the first and second springs 106, 107, which are arranged for providing an adjustable spring force on the throttle member 104. However, it is within one or more embodiments of the present disclosure that the spring arrangement 105 comprises more than two springs, such as for example three or four springs. All springs may be placed along the same axis of compression. When further provided with a third spring, the spring arrangement 105 may be adjustable to operate in the high pressure mode with the spring force acting on the throttle member 104 being provided by the first, second and third springs. The spring arrangement 105 may further be adjustable to operate in an intermediate pressure mode with the spring force acting on the throttle member 104 being provided by the first and second springs 106, 107 only, and not by the third spring. When further provided with a fourth spring, the spring arrangement 105 may be adjustable to operate in the high pressure mode with the spring force acting on the throttle member being provided by the first, second, third and fourth springs. Here, the spring arrangement 105 may be adjustable to operate in several intermediate pressures mode, wherein for a first intermediate pressure mode the spring force acting on the throttle member 104 is provided by the first and second springs, and not by the third and fourth springs, and wherein for a second intermediate pressure mode the spring force acting on the throttle member 104 is provided by the first, second and third springs, and not by the fourth spring.

The invention has been described in conjunction with various embodiments herein. However, other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. An adjustable valve, said valve comprising:
   a first housing part with one or more fluid entry openings and one or more fluid exit openings;
   a movable throttle member configured for regulating the through flow area of the one or more fluid exit openings in response to a difference in pressure across the throttle member;
   a spring arrangement configured for providing a spring force acting on the throttle member in a direction that increases the through flow area of the one or more fluid exit openings;
   wherein the spring arrangement comprises at least a first and a second spring;
   wherein the spring arrangement is adjustable to operate in a low pressure mode with the spring force acting on the throttle member being provided by the first spring only, and to operate in a high pressure mode with the spring force acting on the throttle member being provided by at least both the first and second springs;
   wherein the first and second springs are compression coil springs placed along the same axis of compression;
   wherein the first spring is positioned for providing a spring force to the throttle member;
   wherein the position of the second spring is adjustable between a low pressure setting, in which the second spring is not providing a spring force to the throttle member, and a high pressure setting, in which the second spring is positioned for providing a spring force to the throttle member; and
   the first and second springs have different diameters, and wherein when in the high pressure setting the second spring encompasses the first spring.

2. A valve according to claim 1, wherein a bottom part of the first spring is arranged at a fixed position along the axis of compression, and wherein the position of a bottom part of the second spring is adjustable along the axis of compression.

3. A valve according to claim 1, further comprising a spindle holding first and second springs supports, wherein the spindle is arranged along the compression axis of the springs with the springs encompassing at least part of the spindle, wherein a bottom part of the first spring is supported by the first spring support and a bottom part of the second spring is supported by the second spring support, and wherein the second spring support can be moved in the axial direction of the spindle for adjusting the position of the second spring.

4. A valve according to claim 3, wherein the spindle and the second spring support are configured for moving the second spring support by rotating the spindle.

5. A valve according to claim 1, wherein the throttle member comprises a diaphragm or rolling diaphragm having an inner part receiving the spring force provided by the spring arrangement and an outer part cooperating with the one or more fluid exit openings to thereby regulate the through flow area.

6. A valve according to claim 5, wherein an inner peripheral edge of the diaphragm is secured to an upper part of a cap being axially displaceable along a compression axis of the springs, and wherein a lower part of the cap is configured for receiving upper ends of the first and second springs.

7. A valve according to claim 3, wherein a cap is axially displaceable arranged on the spindle, with the springs arranged between the cap and the first and second spring supports.

8. A valve according to claim 5, wherein an outer peripheral edge of the diaphragm or the rolling diaphragm is secured to the walls of the first chamber above the one or more fluid exit openings.

9. An adjustable valve, said valve comprising:
   a first housing part with one or more fluid entry openings and one or more fluid exit openings, wherein the first housing part defines a first chamber with the one or more fluid entry openings being configured at a lower part and the one or more fluid exit openings being configured at an upper part of the first chamber;
   a movable throttle member arranged in the upper part of the first chamber for regulating the through flow area of the one or more fluid exit openings in response to a difference in pressure across the throttle member;
   a spring arrangement configured for providing a spring force acting on the throttle member in a direction that increases the through flow area of the one or more fluid exit openings;
   a second housing part defining a second chamber above the diaphragm and the first chamber, with the pressure in the first chamber acting on the diaphragm for increasing the through flow area of the one or more fluid exit openings and the pressure in the second chamber acting on the diaphragm for decreasing the through flow area of the one or more fluid exit openings;
   wherein the spring arrangement comprises at least a first and a second spring; and
   wherein the spring arrangement is adjustable to operate in a low pressure mode with the spring force acting on the throttle member being provided by the first spring only, and to operate in a high pressure mode with the spring force acting on the throttle member being provided by at least both the first and second springs.

10. A valve according to claim 9, wherein the second housing part holds a control port in fluid connection with the second chamber.

11. A valve according to claim 9, wherein the throttle member comprises a diaphragm or rolling diaphragm having an inner part receiving the spring force provided by the spring arrangement and an outer part cooperating with the one or more fluid exit openings to thereby regulate the through flow area.

12. A valve according to claim 11, wherein an inner peripheral edge of the diaphragm is secured to an upper part of a cap being axially displaceable along a compression axis of the springs, and wherein a lower part of the cap is configured for receiving upper ends of the first and second springs.

13. A valve according to claim 11, wherein an outer peripheral edge of the diaphragm or the rolling diaphragm is secured to the walls of the first chamber above the one or more fluid exit openings.

14. An adjustable valve, said valve comprising:
   a first housing part with one or more fluid entry openings and one or more fluid exit openings;
   a movable throttle member configured for regulating the through flow area of the one or more fluid exit openings in response to a difference in pressure across the throttle member;
   a spring arrangement comprising at least a first and a second spring configured for providing a spring force acting on the throttle member in a direction that increases the through flow area of the one or more fluid exit openings;

wherein the spring arrangement is adjustable to operate in a low pressure mode with the spring force acting on the throttle member being provided by the first spring only, and to operate in a high pressure mode with the spring force acting on the throttle member being provided by at least both the first and second springs;

wherein the first and second springs are compression coil springs placed along the same axis of compression;

wherein the first spring is positioned for providing a spring force to the throttle member;

wherein the position of the second spring is adjustable between a low pressure setting, in which the second spring is not providing a spring force to the throttle member, and a high pressure setting, in which the second spring is positioned for providing a spring force to the throttle member;

the first and second springs have different diameters, and wherein when in the high pressure setting the second spring encompasses the first spring;

a spindle holding first and second springs supports, wherein the spindle is arranged along the compression axis of the springs with the springs encompassing at least part of the spindle, wherein a bottom part of the first spring is supported by the first spring support and a bottom part of the second spring is supported by the second spring support, and wherein the second spring support can be moved in the axial direction of the spindle for adjusting the position of the second spring; and wherein the spindle and the second spring support are configured for moving the second spring support by rotating the spindle.

15. A valve according to claim 14 wherein the first and second springs have different diameters, and wherein when in the high pressure setting the second spring encompasses the first spring.

16. A valve according to claim 14, wherein the throttle member comprises a diaphragm or rolling diaphragm having an inner part receiving the spring force provided by the spring arrangement and an outer part cooperating with the one or more fluid exit openings to thereby regulate the through flow area.

17. A valve according to claim 16, wherein an inner peripheral edge of the diaphragm is secured to an upper part of a cap being axially displaceable along a compression axis of the springs, and wherein a lower part of the cap is configured for receiving upper ends of the first and second springs.

18. A valve according to claim 14, wherein a cap is axially displaceable arranged on the spindle, with the springs arranged between the cap and the first and second spring supports.

* * * * *